Figure 1:
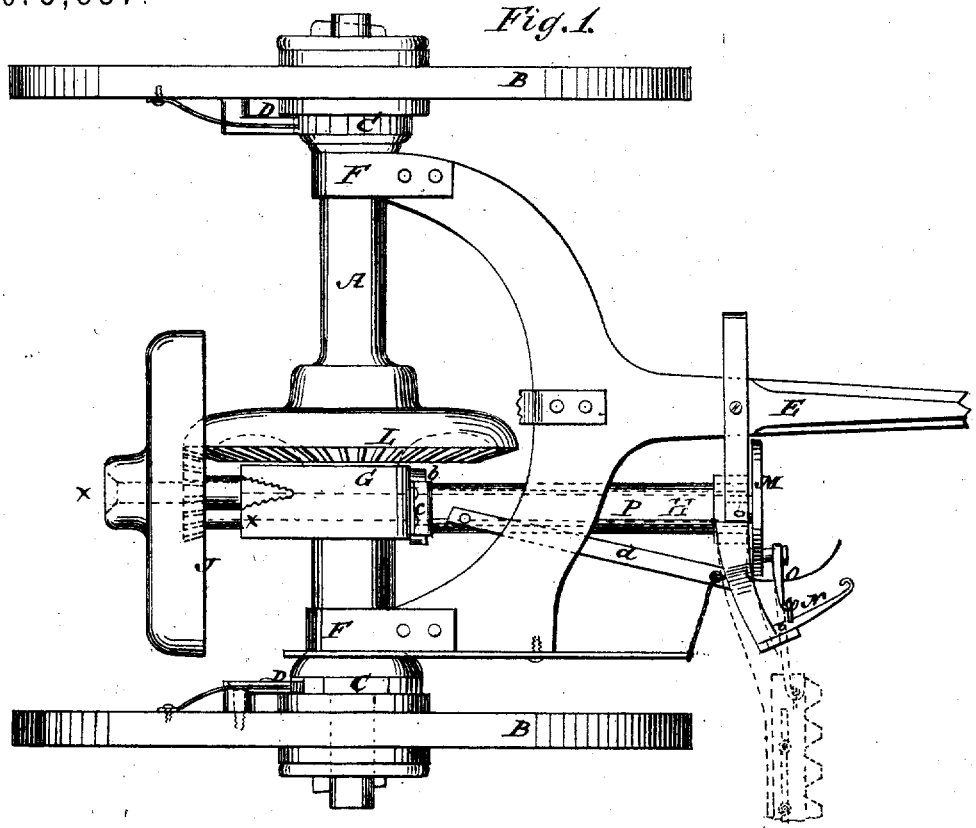

D. H. THAYER.

Harvesters.

No. 5,837. Reissued April 14, 1874.

Witnesses:
E. Wolff.
J. Feibel.

Inventor:
D. H. Thayer
By atty
J. J. McIntire

AM. PHOTO-LITHOGRAPHIC Co. N. Y. (OSBORNE'S PROCESS.)

UNITED STATES PATENT OFFICE.

DANIEL H. THAYER, OF LUDLOWVILLE, NEW YORK.

IMPROVEMENT IN HARVESTERS.

Specification forming part of Letters Patent No. 53,198, dated March 13, 1866; reissue No. 5,837, dated April 14, 1874; application filed March 21, 1874.

*To all whom it may concern:*

Be it known that I, D. H. THAYER, of Ludlowville, in the county of Tompkins and State of New York, have invented a new and useful Improvement in Reaping and Mowing Machines; and I do hereby declare the following to be a full, clear, and exact description thereof, which will enable those skilled in the art to make and use the same, reference being had to the accompanying drawing forming part of this specification.

My invention relates to that kind of reaping and mowing machine known as a "front-cut" machine, with a laterally-projecting cutting apparatus, and belongs to that class or type of construction in which the draft-frame, and the frame carrying the crank and counter-shafts and their gears, and to which the cutting apparatus is attached, are mounted on or connected with the main axle separately or in such manner as to each be free to vibrate about said axle independently of the other. The main objects of my invention are to render this kind of machine capable of a perfectly free rising and falling of the cutting apparatus without any strain upon or tendency to derange the cutter-driving mechanism; such an attachment of the cutting apparatus to the frame carrying the secondary gearing as to induce to greater strength and durability, while at the same time permitting a ready removal and replacement of the former; and a greater degree of compactness, durability, and economy of manufacture; and to these ends and objects my invention consists, first, in having the frame which carries the counter-shaft and crank-shaft vibrate about the main axle, and in so hinging a tubular casting, on which the main shoe is formed, to the said frame that the said tubular casting having the main shoe formed on it, and having the finger-bar rigidly connected to it, shall oscillate about the axis of the crank-shaft, in the manner hereinafter explained; second, in having the frame from which the cutting apparatus is supported provided with bearings for the crank-shaft, and a counter-shaft or stud projecting rearwardly from it and parallel to the line of the crank-shaft, and in so combining therewith the gears, by which motion is imparted from the main gear to the crank-shaft, that the one which drives the crank-shaft pinion and also the one which receives motion from the main gear shall both turn about the said stud, as hereinafter more fully explained; third, in a novel method of arranging and locking together the gear-frame and the tubular casting or sleeve, to which is attached the cutting apparatus, hereinafter more fully described.

To enable those skilled in the art to make and use my improved machine, I will proceed to more fully describe its construction and operation, referring by letters to the accompanying drawings, in which—

Figure 2:
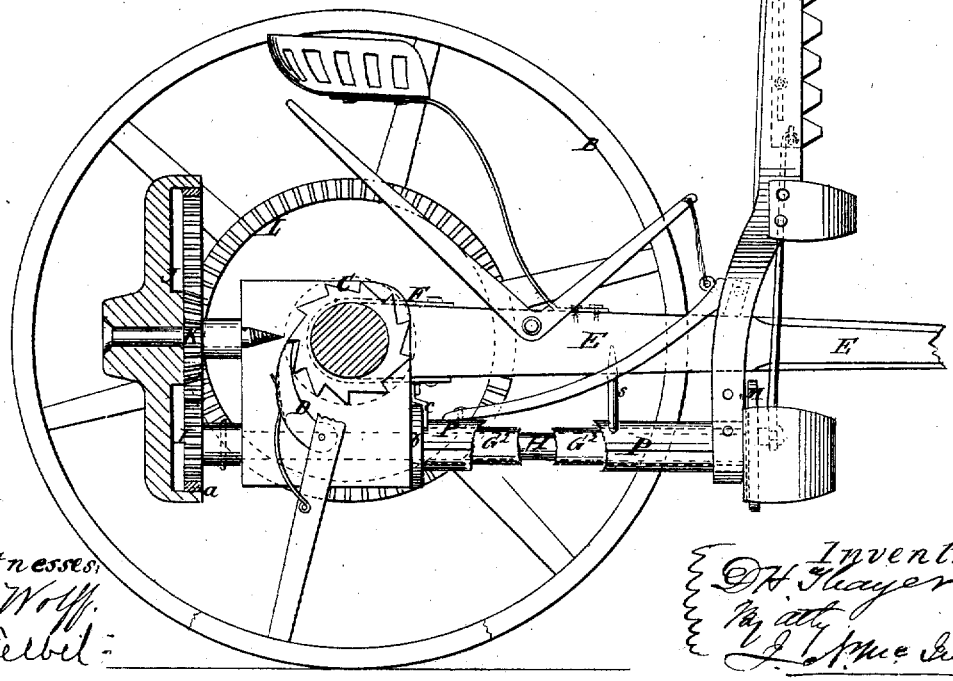

Figure 1 is a top view, and Fig. 2 a side elevation.

In the several figures of the drawing the same letters of reference are used to denote the same parts.

In Fig. 1, the machine is shown as having the cutting apparatus lifted or turned up, the dotted lines illustrating its cutting position, while at Fig. 2 it is shown with the cutting apparatus down.

A is the main axle, which is provided with two driving-wheels, B B, each of which is provided with a pawl, D, adapted to engage with a ratchet-wheel, C, on the axle, so as to permit the wheels B B to rotate when backing without turning the axle A, for purposes well known. E is the draft-frame, the rear portion of which is bifurcated or formed, as shown, in such manner as to straddle or yoke the gear-frame, and is secured by hinge-like connection at F F to the main axle A. Upon the main axle A is mounted, so as to turn freely thereon, a head-block or gear-frame, G, formed with a tubular or pipe-like portion, $G^2$, and in which are formed suitable bearings for the crank-shaft H, which is supported in and carried by said frame G. One end of this shaft H projects rearwardly sufficiently for the accommodation of the pinion I, which is keyed thereon. The greater portion of said shaft is enveloped by the forwardly-extended tubular portion $G^2$ of the head-block or gear-frame, and upon this pipe portion $G^2$ is mounted so as to turn freely a tubular casting, P, on which is formed the main shoe, and to which the cutting apparatus is rigidly attached, as will be presently explained. From the frame G there also projects rearwardly a stud or short shaft, upon which are mounted so as to turn freely an internal spur gear-wheel, J, the teeth in the rim *a* of which mesh with the teeth of pinion I and a bevel-pinion, K, which meshes with the main driving bevel-gear L, which is mounted on the main axle A. On the forward end of the crank-shaft H is secured the usual crank-plate M and wrist-pin, by which, through the medium of the usual pitman O, the necessary reciprocatory motion is imparted to the cutter-bar N. This tubular casting or frame P is held or retained longitudinally upon the pipe portion $G^2$ by means of a lip, *c*, on the front of frame G, which embraces a rim or circular flange, *b*, of the tubular casting P, as clearly shown at Fig. 2, in such a manner as to permit the ready attachment of the casting P to frame portion $G^2$, and its removal therefrom, by simply turning the casting P and the finger-bar out of its normal or proper position.

From the foregoing description it will be understood that, in the operation of my improved machine, no tendency will occur to strain or derange the driving mechanism of the cutting apparatus, or to unduly wear or spring the pitman and its connections, no matter what position the finger-bar may assume during the travel of the machine, since said finger-bar and all its connections move about the axis of the crank-shaft as a center of oscillation; and it will be seen that in my improved machine, since the crank-shaft is supported in the frame G, and the counter-shaft is projected therefrom parallel with the crank-shaft, and the internal spur-gear and bevel-pinion are both arranged on said stud, the secondary gearing will be always maintained in good working condition efficiently and economically.

By the arrangement of the shafts, gears, and secondary frame G, as shown and described, I am enabled to make the gear J and pinion K in one piece, (with a single bearing to turn and fit,) and by the system of gears shown.

At *s* is a rod or pin, projecting downwardly from the draft frame or pole E, in such a manner as to form a stop to the upward motion of the portion P of the machine when lifting up the cutting apparatus. When the driver lifts the cutting apparatus by means of the hand-lever, it comes bodily until the portion P strikes the stop-pin *s*, and then the finger-bar is tipped, and during the continued motion of the hand-lever the outer end of the cutting apparatus is swung upward.

Having so fully explained my invention that any one skilled in the art can make and use it, what I claim as new in my machine, and desire to secure by Letters Patent, is—

1. In combination with a frame which is mounted to turn freely on the main axle, carries the counter-shaft, and is provided with a tubular extension for receiving the crank-shaft, the tubular casting or part to which is attached the cutting apparatus, and which is hinged to vibrate about that part of said frame in which the crank-shaft is located, substantially as and for the purposes set forth.

2. In combination with the frame having a tubular extension or casting, provided with bearings for the crank-shaft, and having a counter-shaft or stud supported at one end only, and arranged parallel with the line of the crank-shaft, a gear and pinion, mounted to turn about the axis of said stud, and serving to transmit motion from the main gear to the pinion of the crank-shaft, as set forth.

3. In combination with the tubular extension or arm-like portion of the frame G, and the tubular casting P arranged thereon, an interlocking flange, *b*, and lip *c'*, the whole constructed and operating together in the manner and for the purpose described.

In testimony whereof I have hereunto set my hand and seal this 20th day of March, 1874.

DANIEL H. THAYER. [L. S.]

In presence of—

J. N. McINTIRE,
JACOB FELBEL.